March 12, 1935.   R. A. LIGHT ET AL   1,993,891
VALVE CONSTRUCTION.
Filed Oct. 19, 1932   2 Sheets-Sheet 2
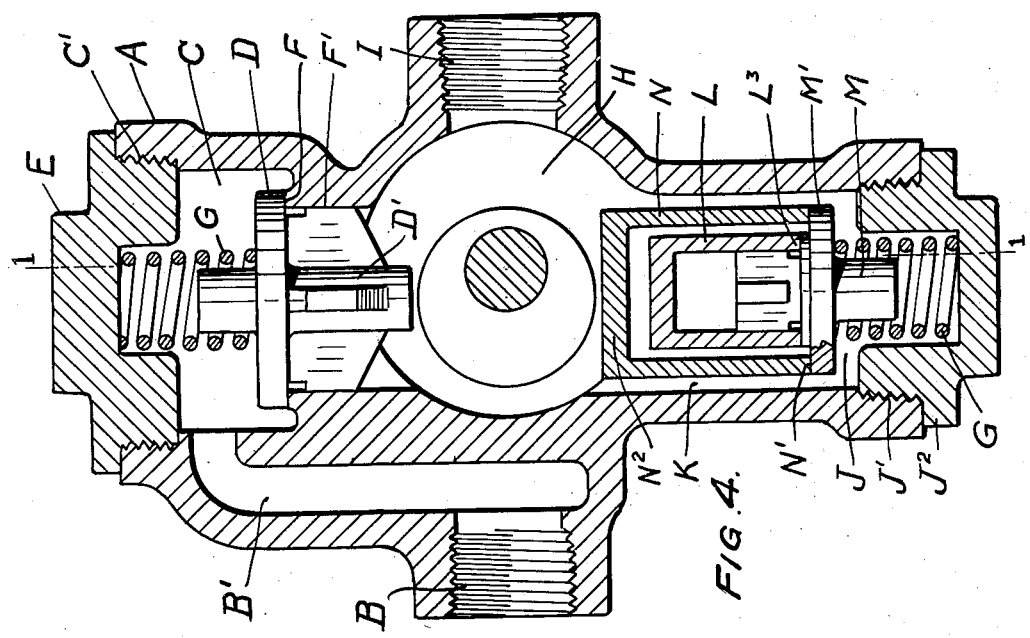
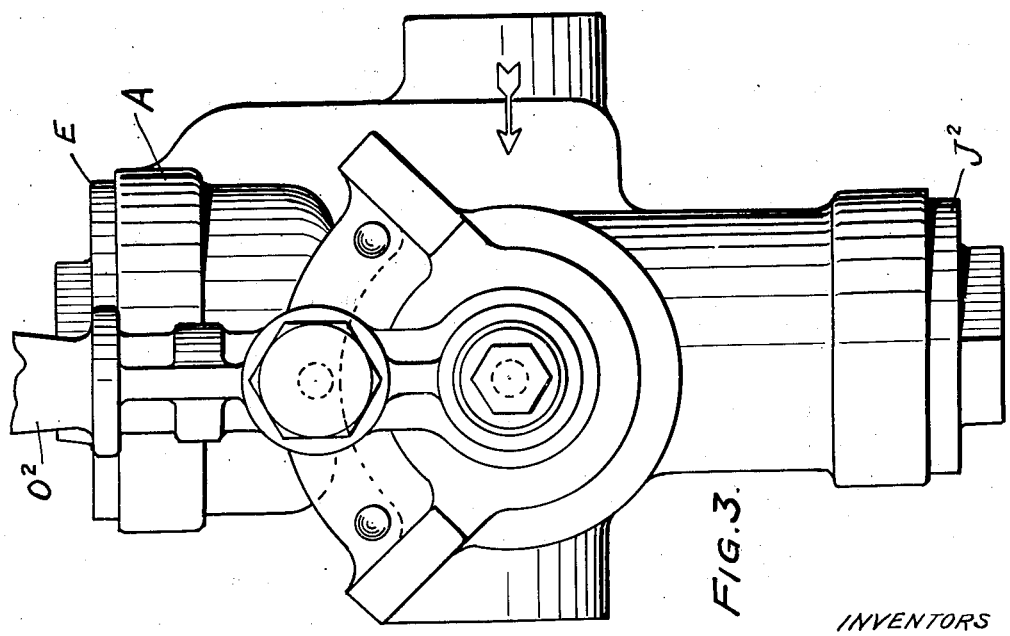
INVENTORS
Ralph A. Light
Joseph W. Price Jr
BY
ATTORNEY.
WITNESS:

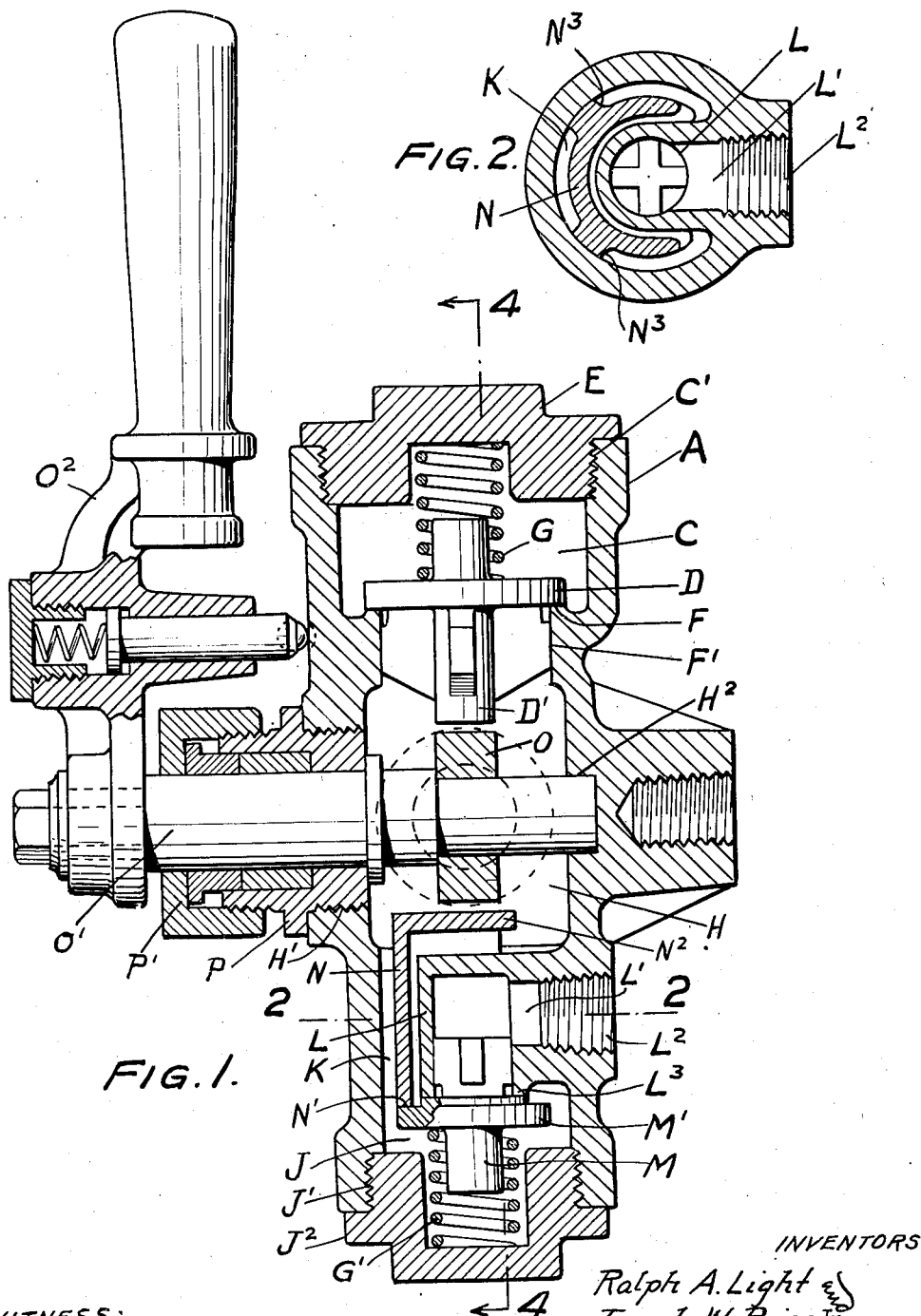

Patented Mar. 12, 1935

1,993,891

UNITED STATES PATENT OFFICE 1,993,891

VALVE CONSTRUCTION

Ralph A. Light, Cynwyd, and Joseph W. Price, Jr., Philadelphia, Pa., assignors to The United States Metallic Packing Company, Philadelphia, Pa., a corporation of Pennsylvania Application October 19, 1932, Serial No. 638,486

2 Claims. (Cl. 277—20)

Our invention relates to a valve construction and has been especially designed for use in connection with locomotive cylinder cocks of the type in which steam pressure from the boiler is employed to hold the exhaust or drainage valve of the cock in closed position although it is obviously adapted for other useful applications. The object of our invention is to provide a valve structure having a chamber to or from which it is desired to alternately admit or exhaust steam, with a simple and highly efficient arrangement and combination of admission and exhaust valves, adapted to be alternately opened and closed by push bars actuated by a movable valve actuating device housed and operating in the main chamber of the valve, and the essential novel features of our valve consist in the cooperative organization of push bars extending into a housing chamber and having their ends so located as to be contacted alternately with a movable valve actuating device located in said chamber with the admission and exhaust valves by means of which steam is alternately admitted to and exhausted from the housing chamber.

The nature of our improvements will be best understood as described in connection with the drawings in which they are illustrated and the novel features of construction are carefully defined in the claims.

In the drawings:

Figure 1 is a sectional elevation taken on the line 1—1 of Fig. 4.

Figure 2 is a cross section on the line 2—2 of Fig. 1.

Figure 3 is a face view of the valve and

Figure 4 is a vertical section on the line 4—4 of Fig. 1.

A is the valve casing casting. B is a threaded inlet passage adapted to be connected to the source of steam supply and communicating through a passage $B^1$ with the inlet valve chamber indicated at C. A threaded opening $C^1$ is provided through the wall of the casing to permit the insertion of the inlet valve indicated at D and this opening is closed by a plug cap E. A seat F is provided for the inlet valve, this seat being formed around the inlet end of the conduit passage $F^1$ and the admission valve is normally held against the seat by a spring G. A push bar $D^1$ extends from the face of the inlet valve through the passage $F^1$ into the housing chamber indicated at H, into which the passage $F^1$ leads and from this chamber leads a passage I, through which connection can be made with a delivery pipe, not shown, leading to any device for the utilization of the steam pressure existing in the chamber H. A threaded opening $H^1$ is provided through the wall of the casing for the introduction of the mechanism provided for the actuation of the valves. J is what we may call the exhaust valve chamber although, as it is in permanent communication with the chamber H, it may, in a sense, be considered as a mere extension of this chamber. As shown, the connection between the chambers H and J is through a passage K, which is made in the form of a segment of an annulus located above the exhaust nozzle, to be described, and of such dimensions and location as to serve as a guide for the push bar, to be described. L is an exhaust nozzle extending downward into exhaust valve chamber J and connecting through a lateral extension $L^1$ with the exhaust port $L^2$. The nozzle L is of, in part, cylindrical form and its open end $L^3$ forms a valve seat for the exhaust valve. A threaded opening $J^1$ is formed in the casting for the introduction of the exhaust valve and is closed by a plug cap $J^2$. M is the exhaust valve which is normally seated on the valve seat $L^3$ and is formed with a projecting rim $M^1$ which extends beyond the valve seat and beyond the cylindrical portion of the exhaust nozzle so that a portion of its projecting rim lies opposite to the annular opening K. The valve is normally held against its seat by a spring, indicated at $G^1$, and also by whatever pressure may exist in the exhaust valve chamber. N is a push bar, the lower portion of which is, as shown, formed as the segment of an annulus adapted to pass through the segmental opening K and of such length that its lower edge $N^1$ will rest upon the annular rim $M^1$ of the exhaust valve, while its upper end $N^2$ will extend into the housing chamber H to a position where it will be engaged by the valve actuating mechanism, to be described. The segmental push bar N must be of such general dimensions that it does not fill the annular opening K, through which it passes, and prevent the free passage of steam from the housing chamber H to the exhaust valve chamber J, while at the same time, it must be so formed as to be properly aligned by contact with the opening and this we provide for by means of flanges $N^3$.

While any movable device, movable through a path which will bring it alternately into contact with the push bars $D^1$ and N and shift said push bars to open the valves with which they are connected, may be used in the housing chamber H, we have shown as a valve actuating device an eccentric O, secured to and rotatable with a spindle $O^1$ which extends through a stuffing box $P^1$ formed in a plug cap P which screws into the threaded opening H¹. A lever O² is shown as secured to the outer end of the spindle O¹ as a convenient means for actuating it and the end of the spindle which is located in the housing chamber is shown as supported in a bearing H² formed in the wall of the housing chamber. The location of the eccentric is, as shown, such as to bring it into registry with the ends of the push bars D¹ and N and its shape is such that a rotative movement of the spindle O¹ will bring it into contact with the push bar D¹ or with the push bar N. Thus, its movement in one direction will open the admission valve and a reverse movement will, first permit the closing of the admission valve and then open the exhaust valve.

In the construction illustrated, the parts are assembled by inserting the push bar N through the opening C¹ of the conduit passage F¹ into and through the housing chamber and into the segmental annular opening K. The admission valve D can then be inserted into the chamber C and contacted with the valve seat F. The spring G and the plug cap E are then inserted. The exhaust valve is inserted through the opening J¹, contacted with the valve seat L³, and the spring G¹ and plug cap J² are then inserted. The spindle O¹ and attached eccentric O and the plug cap P are then inserted through the opening H¹ and the apparatus is ready for use.

In operation, the inlet opening B is connected with a source of steam under pressure so that the admission valve chamber C is normally charged with steam which tends to hold the admission valve D against its seat. The outlet opening I is connected to any device adapted to be actuated by steam pressure and when the spindle O¹ is turned in a direction to bring the eccentric O in operative contact with the push bar D¹ of the admission valve, the admission valve is opened and steam passes freely into the housing chamber H and through its outlet opening I to its point of application. When the spindle is rotated in the opposite direction it permits the admission valve to close and after its closure the eccentric contacts with the push bar N, pushing it down against the rim M¹ of the exhaust valve M, permitting any steam in the housing chamber H or parts connected therewith to exhaust.

Having now described our invention, what we claim as new and desire to secure by Letters Patent, is:

1. A valve structure comprising in combination a casing having formed in it a chamber adapted to serve as a housing for the valve actuating mechanism and having an outlet opening adapted to serve as a delivery port for steam, an inlet valve chamber connected with the housing chamber by a passage around which is formed in the inlet valve chamber a seat for the valve and an exhaust valve chamber in free communication with the housing chamber and an exhaust nozzle projecting into the exhaust valve chamber in a direction opposite to that in which the housing chamber is situated with respect to said exhaust chamber and communicating laterally with an exhaust conduit, said nozzle having a substantially cylindrical external surface on one side and having a valve seat formed around its projecting open end, an admission valve located in the admission valve chamber, means holding said valve in normal contact with its valve seat and an exhaust valve located in the exhaust valve chamber and adapted to be seated on the projecting end of the exhaust nozzle, said valve having a rim extension adapted to extend over and laterally beyond the end of the exhaust nozzle, means normally holding the exhaust valve against its seat, a push bar extending from the front of the admission valve through the passage connecting the admission chamber with the housing chamber into said housing chamber, and a push bar for actuating the exhaust valve provided with a valve rim contacting end having the shape of a segment of an annulus, the inner diameter of which is such as to enable it to pass by the cylindrically formed portion of the exhaust nozzle, a movable valve actuating device located in the housing chamber and adapted to alternately contact with the push bars extending into said housing chamber to operate the valves and means located externally of the casing for actuating said movable valve actuating device.

2. In a valve structure having the features of claim 1, the formation of the exhaust nozzle with a substantially cylindrical external surface on one side, the provision between the housing chamber and exhaust chamber of an opening having the form of the segment of an annulus and adapted to serve as a guide for the push bar contacting with the exhaust valve and the formation of the push bar as the segment of an annulus adapted to pass through and be guided by said annular opening to clear the cylindrical side of the exhaust nozzle and rest at its end upon an extended portion of the exhaust valve rim.

RALPH A. LIGHT.
JOSEPH W. PRICE, Jr.